United States Patent
Veitsel et al.

(10) Patent No.: US 7,764,226 B1
(45) Date of Patent: Jul. 27, 2010

(54) UNIVERSAL DIGITAL CHANNEL FOR RECEIVING SIGNALS OF GLOBAL NAVIGATION SATELLITE SYSTEMS

(75) Inventors: Andrey Veitsel, Moscow (RU); Alexey Zhdanov, Moscow (RU); Alexander Kirsanov, Moscow (RU); Mark I. Zhodzishsky, Moscow (RU); Victor A. Veitsel, Moscow (RU); Igor Orlovsky, Moscow (RU); Dmitry Rubtsov, Moscow (RU)

(73) Assignee: Topcon GPS, LLC, Oakland, NJ (US)

( * ) Notice: Subject to any disclaimer, the term of this patent is extended or adjusted under 35 U.S.C. 154(b) by 144 days.

(21) Appl. No.: 11/732,281

(22) Filed: Apr. 3, 2007

Related U.S. Application Data

(60) Provisional application No. 60/790,470, filed on Apr. 7, 2006.

(51) Int. Cl.
*G01S 19/33* (2010.01)
*G01S 19/37* (2010.01)
(52) U.S. Cl. ................................. 342/357.12
(58) Field of Classification Search ........................ None
See application file for complete search history.

(56) References Cited

U.S. PATENT DOCUMENTS

| | | | |
|---|---|---|---|
| 5,953,367 A | 9/1999 | Zhodzicshsky et al. | |
| 6,273,189 B1 | 8/2001 | Gissler et al. | |
| 6,463,091 B1 | 10/2002 | Zhodzicshsky et al. | |
| 6,493,378 B1 * | 12/2002 | Zhodzishsky et al. | ....... 375/149 |
| 7,428,259 B2 * | 9/2008 | Wang et al. | ................. 375/142 |
| 2003/0231580 A1 * | 12/2003 | Martin et al. | ................ 370/203 |
| 2005/0270997 A1 * | 12/2005 | Julien et al. | ................. 370/315 |
| 2006/0176215 A1 * | 8/2006 | Dubash et al. | ......... 342/357.06 |

FOREIGN PATENT DOCUMENTS

| | | |
|---|---|---|
| EP | 1054265 A2 * | 11/2000 |
| EP | 1063584 A1 * | 12/2000 |
| WO | WO 0139364 A1 * | 5/2001 |

OTHER PUBLICATIONS

D. Avagnina et al, "Definition of a reconfigurable and modular multi-standard navigation receiver," GPS Solutions (2003) 7:33-40.*
A. Simsky et al, "Galileo/GPS Receivers for Geodeitc Applications," EUREF 2005 (May 5, 2005), www.septrino.com, pp. 1-12.*
Col. W.N. McCasland et al, "Open System Architecture (OSA) for Dual-Use Satellite Navigation," 2000 IEEE Aerospace Conference Proc. Mar. 2000, pp. 99-110.*

(Continued)

*Primary Examiner*—Gregory C Issing
(74) *Attorney, Agent, or Firm*—Wolff & Samson PC

(57) ABSTRACT

Disclosed is a system and method for processing signals received from different global navigation satellite systems. The receiver includes a number of universal digital channels. The universal digital channel can be used to receive and process different code signals of each of the three navigation satellite systems GPS, GLONASS, and GALILEO. The universal digital channels have the same structure. Each of them can be tuned to receive different signals. The core of the universal digital channel is a code generator and a universal strobe generator.

32 Claims, 8 Drawing Sheets

OTHER PUBLICATIONS

Zhdanov, A. et al., "Evolution of Multipath Error Reducation with Signal Processing", GPS Solutions, vol. 5, No. 3, pp. 19-28 (2002).
Zhdanov, A. et al., "Multipath Error Reduction in Signal Processing", ION GPS '99, Sep. 14-17, 1999, Nashville, TN, pp. 1217-1223.
Veitsel, V. et al., "The Mitigation of Multipath Errors by Strobe Correlators in GPS/GLONASS Receivers", GPS Solutions, vol. 2, No. 2, pp. 38-45 (1998).

* cited by examiner

UNIVERSAL DIGITAL CHANNEL FOR RECEIVING SIGNALS OF GLOBAL NAVIGATION SATELLITE SYSTEMS

This application claims the benefit of U.S. Provisional Application No. 60/790,470 filed Apr. 7, 2006, which is incorporated herein by reference.

FIELD OF THE INVENTION

The present invention relates generally to receivers and more particularly to a receiver of signals from global navigation satellite systems (GNSS).

BACKGROUND OF THE INVENTION

Satellite positioning systems are typically used to accurately determine the position of users possessing special navigation receivers. A navigation receiver receives and processes radio signals transmitted by satellites located within a line-of-sight distance of the receivers. The satellite signals include carrier signals that are modulated by pseudo-random binary codes.

The receiver measures the time delay of the received signal relative to a local reference clock or oscillator. Code measurements enable the receiver to determine the so-called pseudo-ranges between the receiver and the satellites. The pseudo-ranges are different from the ranges (distances) between the receiver and the satellites due to various error sources and variations in the time scales of the satellites and receiver. If the number of satellites is large enough, then the measured pseudo-ranges can be processed to determine user's code coordinates and coordinate time scales. These receivers typically provide meter-level accuracy.

To improve the accuracy of these receivers beyond meter-level accuracy, differential navigation (DN) has been developed. In differential navigation, the task of finding the user position, also called a Rover, is performed relative to a Base station. The precise coordinates of the Base station are known because the Base station is stationary during measurements. The Base station has a navigation receiver which receives and processes the signals of the satellites. These signal measurements are transmitted to the Rover via a communication channel (e.g., wireless). The Rover uses these measurements received from the Base station, along with its own measurements taken with its own navigation receiver, in order to precisely determine its location. The determination of the Rover's location is improved in the differential navigation mode because Base station measurements are also used in the determination. Base station measurements can compensate for the major part of strongly correlated errors. A system that uses DN mode based on measuring pseudo-ranges only is called a Differential Global Positioning System (DGPS).

The accuracy of a location determination using differential navigation may be improved further by supplementing the pseudo-range measurements with measurements of the phases of the satellite carrier signals. If the carrier phase of the signal received from a satellite in the Base station receiver is measured and compared to the carrier phase of a signal from the same satellite measured in the Rover receiver, the accuracy of a measurement may be within several percent of the carrier's wavelength. Real-time carrier signal based differential navigation is often referred to as real-time kinematic (RTK) navigation. The practical implementation of these advantages often encounters the problem of ambiguity resolution for phase measurements. Some multi-frequency receivers can receive satellite signals within multiple frequency bands. As a result, these receivers may be able to measure carrier phases on multiple frequencies, thereby allowing for ionosphere delay corrections and facilitating ambiguity resolution.

In many instances, the Rover receiver operates in a complicated environment in which various external influences cause measurement errors. For example, external signals may interfere with the satellite signals, and structures and terrain may result in multipath errors. Errors are often classified as normal errors or abnormal errors. Normal errors are related to a receiver fundamental error source and relatively weak signals which are reflected from local objects. There are normal errors due to parasitic changes in wave propagation delay in atmosphere, inaccurate knowledge of satellite trajectories, onboard clock offset, thermal noise and other reasons. Abnormal errors are large errors which may prevent the system from calculating an accurate location. Such abnormal errors are occasionally a consequence of occasional spikes of intrinsic noise. More often, however, they are the result of exposure of the receiver to some type of interference. For example, strong reflected signals and extreme radio interference can cause abnormal errors. Short-term partial shading of the Rover receiver by a local object may also considerably increase measurement errors in one or more "shaded" satellite channels due to radio wave diffraction. If a satellite is completely shaded (i.e., blocked), tracking in the channel is interrupted, and the measured delay drifts because of reflected, still unshaded signals. Dynamic effects on the receiver (i.e., certain motion of the Rover) may also cause abnormal errors. Impulse accelerations or jerks impact both the receiving antenna and the quartz of the local reference oscillator and may result in the drift of the intermediate carrier frequency and measured phase.

One specific type of abnormal error is a cycle slip in phase lock loop (PLL) circuits of the receiver. The PLL circuits track the satellite carrier signal. After a cycle slip occurs, the PLL circuit locks to a new point of steady balance, after which it goes on with tracking the satellite carrier signal. As a result of the cycle slip, an abnormal error equal to several integer numbers of half-cycles is introduced into the full phase measurements. There are special techniques to detect cycle slips and to avoid errors propagating into final coordinates.

Much of the advancements in satellite positioning equipment has been directed to suppressing the various types of errors. There are techniques and devices that detect and eliminate measurements from some satellites when strong distortion is present. There are also techniques for analyzing observation results which allow for redundancy of a number of satellites to isolate a few unreliable measurements. Methods of reducing multipath are based on techniques for isolating and eliminating reflected signals that are delayed relative to the direct signal.

GNSS equipment may use receiver channels that are capable of receiving and co-processing signals from a plurality of satellites. This is advantageous for various reasons. First, the redundancy of satellite channels enables the use of statistical processing techniques (for instance, least squares techniques (LST)) in the determination of coordinates. The greater the number of satellites, the more efficient the process of averaging, and more accurate data may be obtained. Further, the more satellites, the more favorable their constellation for a specific user is, and better dilution of precision (DOP) can be gained. Finally, the redundancy of satellite channels enhances the ability to detect and eliminate abnormal measurements.

The European Union has launched the Galileo satellite radio navigation system. There remains a need to have a receiver that can efficiently receive and process the active satellite navigation systems (GPS (USA), GLONASS (Russia), and Galileo (European Union)).

BRIEF SUMMARY OF THE INVENTION

Universal digital channels can be used to receive and process different code signals of each satellite navigation system (GPS, GLONASS, GALILEO). Each of these systems transmits different signals on the carrier frequency: m-sequences in GLONASS, Gold codes and L2C code in GPS, and Gold codes and BOC signals in Galileo. As the number of digital channels in the receiver is smaller than the total number of signals in the three systems, there is a need to switch channels to track such satellites that are visible at the moment. The universal digital channels have the same structure. Each universal digital channel can be adjusted to receive different signals. Such capability is typically provided by the receiver's processor and depends on information about a satellite being visible.

The core of the universal digital channel is a universal code generator and universal strobe generator. The universal code generator forms code sequences for each of the signals selected from the information from the processor. The universal strobe generator generates strobe sequences (from the processor information) as reference signals for correlators. The receiver processor can determine the strobe shape for this sequence.

The strobe shape determines the extent of multipath suppression. The efficiency of multipath suppression may depend on both receiver RF-part filters and strobe parameters (shape and duration). The optimal strobe duration for a preset shape of strobe can be set for each RF-part by a trade-off between reducing multipath errors and increasing noise errors. The universal strobe generator can assign strobes of different shapes and duration. It enables the digital channel to be adapted for reception of signals from different navigation systems taking into account the features of the receiver RF-part.

In accordance with an aspect of the present invention, in order to process signals received from different global navigation satellite systems, a universal code generator is configured to generate codes and a universal strobe generator is configured to generate a strobe sequence. Further, a carrier generator is configured to generate a reference carrier.

In one embodiment, the codes include one of m-sequence codes and Gold codes. The codes may be multiplied by a sub-carrier signal to generate binary offset carrier (BOC) signals. The universal code generator can include m-sequence generators, a sub-carrier generator, and a switch to redirect Gold codes or binary offset carrier signals. To generate a Gold code, two m-sequences are added in the universal code generator. Each m-sequence generator includes a shift register, an initial state register, and polynomial register values. The polynomial register values are logically added to the values of the shift register and the sum is transmitted to the input of the shift register. The shift register and the initial state register may be at least twenty-seven bits, thereby enabling a plurality of possible civil signals for different navigation systems to be generated.

In one embodiment, a frequency of a sub-carrier signal is coherent with a frequency of a code sequence generated by an m-sequence generator. Further, in one embodiment the frequency of the sub-carrier signal is greater than or equal to the frequency of the code sequence. The frequency of the code sequence may be generated by dividing the sub-carrier signal frequency by a dividing factor. The dividing factor may be, for example, equal to 1 ... 8 with an interval of 0.5 and may therefore allow different binary offset carrier signals to be generated.

The strobe sequence is generated from single strobes which are repeated over time. The center of each single strobe coincides in time with the code chip boundary. The single strobe is a vector. The elements of this vector describe strobe shape and can take different values, such as one of the three possible values +1, −1 or 0. Each element has a specific duration, but the duration of the vector does not exceed chip duration. Different vectors correspond to the presence or absence of transition in the code sequence. The transition sign changes the vector sign. The duration of elements can be reduced by shortening the total strobe duration.

These and other advantages of the invention will be apparent to those of ordinary skill in the art by reference to the following detailed description and the accompanying drawings.

DETAILED DESCRIPTION OF THE INVENTION

Figure 1:
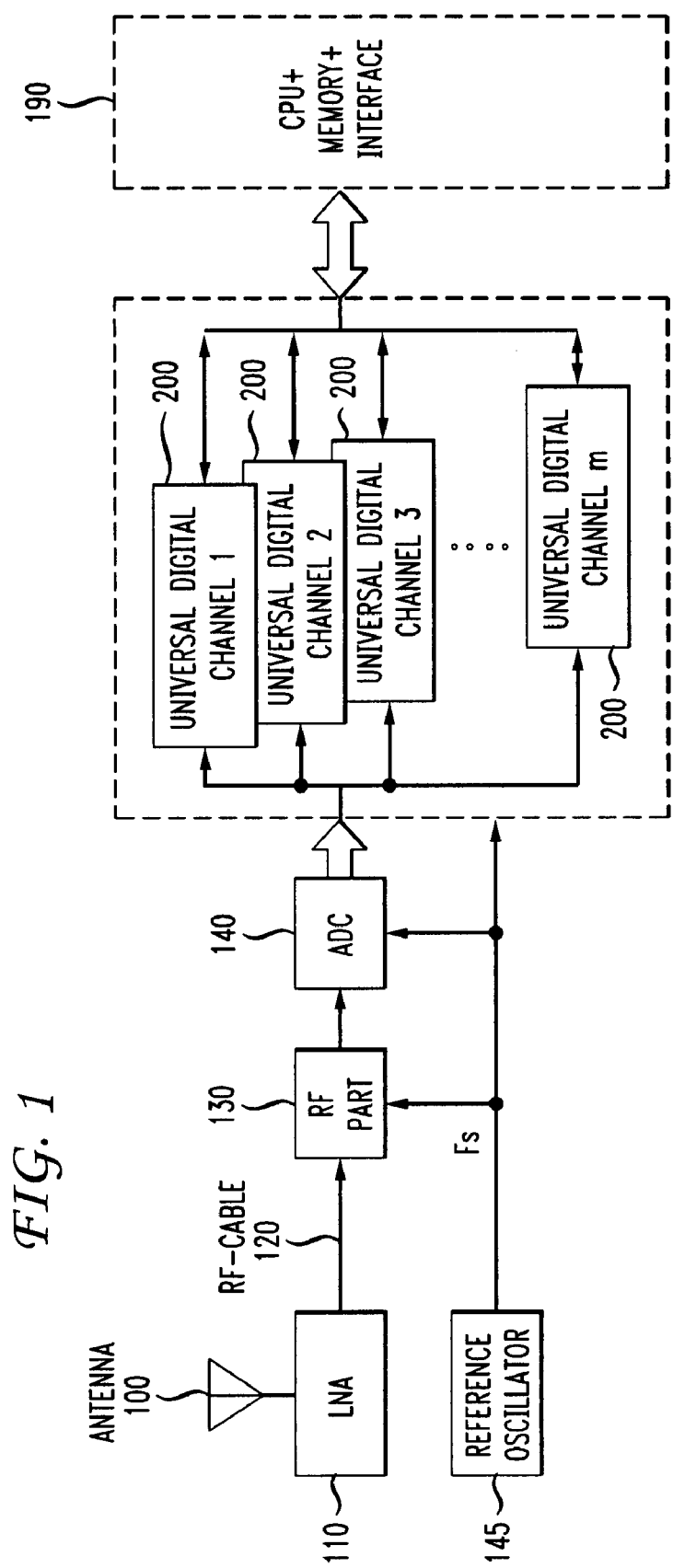
FIG. 1 shows a block diagram of a GNSS receiver in accordance with an embodiment of the present invention.

Different satellite systems typically transmit signals in frequency bands that are relatively close together (1560-1605, 1150-1280 MHz). Both the GPS and GLONASS satellites transmit a signal known as a Pseudo Random Noise (PRN) code which spreads the spectrum of signals and allows ranges to be measured. The power levels of the received signals are lower than intrinsic noise in the input band of the receiver.

In accordance with an aspect of the present invention, a receiver can receive signals from many satellite systems. When processing signals received from a plurality of satellites, the receiver can take into account the similarities and differences of the signals.

For example, if the receiver simultaneously receives signals from GLONASS satellites and GPS satellites, the receiver may determine that:

Both types of satellites (i.e., GLONASS satellites and GPS satellites) transmit on two frequency bands, called L1 and L2.

Both types of satellites transmit PRN codes in the L1 frequency band, known as Coarse/Acquisition (C/A) code for GPS and Standard (S) for GLONASS.

Both types of satellites transmit more accurate PRN codes, known as Precise (P) code, on both L1 and L2 frequencies.

C/A and P-code carriers have the same frequency but are shifted by $\pi/2$ in phase. In addition, the codes are inversely modulated by information symbols. Clock rate of the binary elements (information symbols) is typically 50 Hz.

The receiver may also determine differences between the signals received from GLONASS satellites and GPS satellites, such as:

The signals of different GPS satellites in each band are transmitted on the same carrier frequency (in the L1: 1575.42 MHz, in the L2: 1227.6 MHz). Signals from different satellites differ from each other by individual PRN-codes. As to GLONASS, signals received from different satellites have the same S-code and P-code, but differ in individual carrier frequency.

The GPS PRN-code rate is 1,023 MHz for C/A code and 10.230 MHz for P-code. PRN-code chip duration is $\Delta=977.52$ ns for C/A-code and $\Delta=97.75$ ns for P-code. Code rate of GLONASS PRN-code is 0.511 MHz ($\Delta=1956.95$ ns) for S-code and 5.110 MHz ($\Delta=195.69$ ns) for P-code.

In GPS, P-code is additionally modulated with W-code. W-code has a structure that is unknown to civil users. GLONASS does not have such modulation.

As described in more detail below, the receiver has a plurality of receiver channels. Each receiver channel processes a signal received from one of the plurality of satellites. The processing includes accumulating the products of successive multiplication of the signal (which has passed input and filtering circuits and a frequency converter) by the reference carrier and reference code that are generated in the receiver. The reference carrier corresponds to the receiver signal carrier for the given satellite, while the reference code matches the PRN code of the same satellite. A unit that carries out multiplication and accumulation is referred to herein as a correlator. Several channels have their own correlators and are assigned for each satellite. Each correlator is different from other correlators due to one or more reference signals. Output correlator signals are further used in the receiver tracking circuits (the Delay Lock Loop (DLL) and Phase Lock Loop (PLL)).

There are several ways to design the channels of such a receiver. One typical channel structure includes three correlators and enables coherent generation of the reference carrier. The first correlator computes in-phase correlation signal I. This signal can be obtained when the reference carrier is in-phase with the input signal and is therefore the in-phase component of the input signal. The reference code in the first correlator is a replica of the PRN code modulating the input signal. In one embodiment, signal I is used to demodulate binary symbols, and may also be used as an additional signal for normalization.

The second correlator computes quadrature correlation signal Q. This signal is obtained when the reference carrier is shifted by $\pi/2$ from the input carrier. The reference code is typically the same as in the first correlator. In one embodiment, signal Q is used to generate an error signal in the PLL.

The third correlator computes correlation signal dI. Correlation signal dI may be used to control the DLL. To obtain this signal, the first reference carrier, which is in-phase with the input signal carrier, is used with a reference code that consists of short strobe-pulses corresponding to PRN chips. The sign of strobe-pulses is the same as the sign of the chip coming after a corresponding strobe.

Time offsets of the reference codes in the first and second correlators may be strongly connected with an adjustable DLL shift of the main reference code in the third correlator. To control the time offset of the DLL main reference code, an error signal proportional to dI is generated.

In another embodiment, channels are designed using four correlators and a non-coherent reference carrier. Correlation of the reference carrier with the input signal results in generating two orthogonal components, while correlation with the reference code (as an input signal PRN-code replica) leads to two orthogonal correlation signals I and Q. In the third correlator, the first orthogonal component of the input signal and a reference code (short strobes) are used to form dI. In the fourth correlator, the second orthogonal component and the reference code similar to that of the third correlator are used to generate correlation signal dQ.

The quality of DLL operation may be affected by the discriminator characteristic. The discriminator characteristic is typically determined by a dependence of error signal versus time offset between the reference code and input signal.

To have PLL and DLL lock onto and track signals, delay searching and frequency searching are used. Delay searching sets an initial delay of reference code. If the error of setting the initial delay does not exceed DLL lock-in range, then DLL goes to a steady balance point. In searching by frequency, an initial frequency of the reference carrier is set with an error that does not exceed the PLL lock-in range. The PLL and DLL capability of suppressing multipath depend on the shape of the reference code.

If the main DLL correlator utilizes short, single, rectangular strobe pulses as a reference code, the DLL may suffer from multipath less than the well-known "Wide" correlator (with a chip span). Both correlators, however, often react to reflected signals with a delay less than one chip and provide approximately the same signal lock-in range.

Applying complex strobes consisting of some rectangular pulses of different polarity, it is possible to fully suppress reflected signals with delay relative to the direct signal of 0.05-0.1 chip. A drawback of this method is a decrease in the DLL lock-in range (by delay) and an increase in the DLL noise error with such a reference code.

To eliminate this drawback, a two-stage acquisition procedure may be used. In the first stage, a reference code consists of single rectangular strobes, thereby providing a wide lock-in range which matches searching systems. In this state, mismatch decreases such that it would be sufficient for locking at the second stage, where complex strobes are used.

Block II/IIA and Block IIR GPS satellites typically emit the civilian C/A code on the L1 frequency, and the military P(Y) code on both the L1 and L2 frequency. The Block IIR-M satellites may continue to emit the same signals as the previous two blocks, but may also have a new signal added—L2C on the L2 frequency. In addition, the fourth generation of satellites, Block IIF, may have the capabilities of the previous blocks plus a new military M signal on both L1 and L2 and a new civil code at a third frequency, L5.

GPS signal in the L1 range has a carrier frequency of 1575.42 MHz, code rate 1.023 MHz, and code length 1023 chips. GPS signal in the L2 range has a carrier frequency of 1227.60 MHz. The new civil signal L2C is time-multiplexing consisting of the two codes, the CM and the CL. Multiplexing is implemented on the frequency of 1.023 MHz, and the code rate is 511.5 kHz.

The CM and CL codes have different chip numbers. The CM code is 10,230 chips and repeats every 20 milliseconds. It is bi-phase modulated with message data. The CL code is 767,250 chips and repeats every 1.5 seconds. The CL code is not modulated by binary symbols and typically has cross-correlation properties in the range of about −45 dB. In one embodiment, to generate both codes, a 27-degree polynomial is used. ICD-GPS-200C includes the initial and final generator registers of the CM and CL codes for the satellites.

The L5 GPS signal has a carrier frequency of 1176.45 MHz, code rate of 10.23 MHz and code length of 10230 chips. A civil code at a third frequency, L5, may have two orthogonal components. Each component is modulated with its own code and one of them is modulated by binary symbols. In one embodiment, to generate both codes, a 13-degree polynomial is used.

The European Union Galileo system may provide 10 navigation signals (binary phase shift key (BPSK) and binary offset carrier (BOC)) in right-hand circular polarization (RHCP) in the frequency ranges 1164-1215 MHz (E5a and E5b), 1260-1300 MHz (E6) and 1559-1592 MHz (E1), which are part of the Radio Navigation Satellite Service (RNSS). (As used herein, the frequency band E1 is sometimes denoted as L1 for convenience). BOC(m, c) is formed by multiplying the Gold code by the sub-carrier frequency. This signal is characterized by two parameters—chip rate fc and the sub-carrier frequency fm, where $c=fc/f_{C/A}$, $m=fm/f_{C/A}$, $f_{C/A}=1.023$ [MHz]

Two signals on E6 with encrypted ranging codes, including one data-free channel, may be accessible to dedicated users who gain access through a given Commercial Service (CS) provider. Finally, two signals (one in E6 band and one in E1) with encrypted ranging codes and data may be accessible to authorized users of the Public Regulated Service (PRS).

In the frequency range E1, the satellite may transmit BOC (15,2.5) for the PRS. The E6 frequency range may be a commercially used BPSK signal. The E5 frequency range includes two sub-ranges: E5a which is the same as the L5 GPS, and E5b. In the E5 frequency range, two orthogonal signal components—either BPSK (10) or BOC (15,10)—may be transmitted in each sub-range. In the Galileo satellite system, the Gold code is formed with the help of a 25-degree polynomial depending on the range. Table 1 presents information about the Galileo signals for different ranges.

TABLE 1

| Signal | E5a and E5b band | E6 band, 1278.75 MHz | E1 band, 1575.42 MHz |
| --- | --- | --- | --- |
| I/Nav (Open service) | BPSK(10) or BOC(15,10) | — | BOC(2,2) or BOC(1,1) |
| G/Nav (public regulated service) | — | BOC(10,5) | BOC(15,2.5) |
| C/Nav (commercial service) | — | BPSK(5) | — |

The receiver may be a single unit or may be multiple receiver blocks (e.g., that communicate with each other). If the receiver is integrated in a single housing, the receiver consists of an antenna, a low-noise amplifier, an RF-part ASIC for primary signal processing, and a digital part which comprises a microprocessor, a memory block, and peripheral units. Radio signals from the RF-part are quantized according to a few levels and transmitted to the ASIC. The ASIC includes a number of universal channels to receive signals of satellite systems such as GPS, GLONASS and GALILEO. A single universal channel can typically receive only one of the satellite signals.

Figure 2:
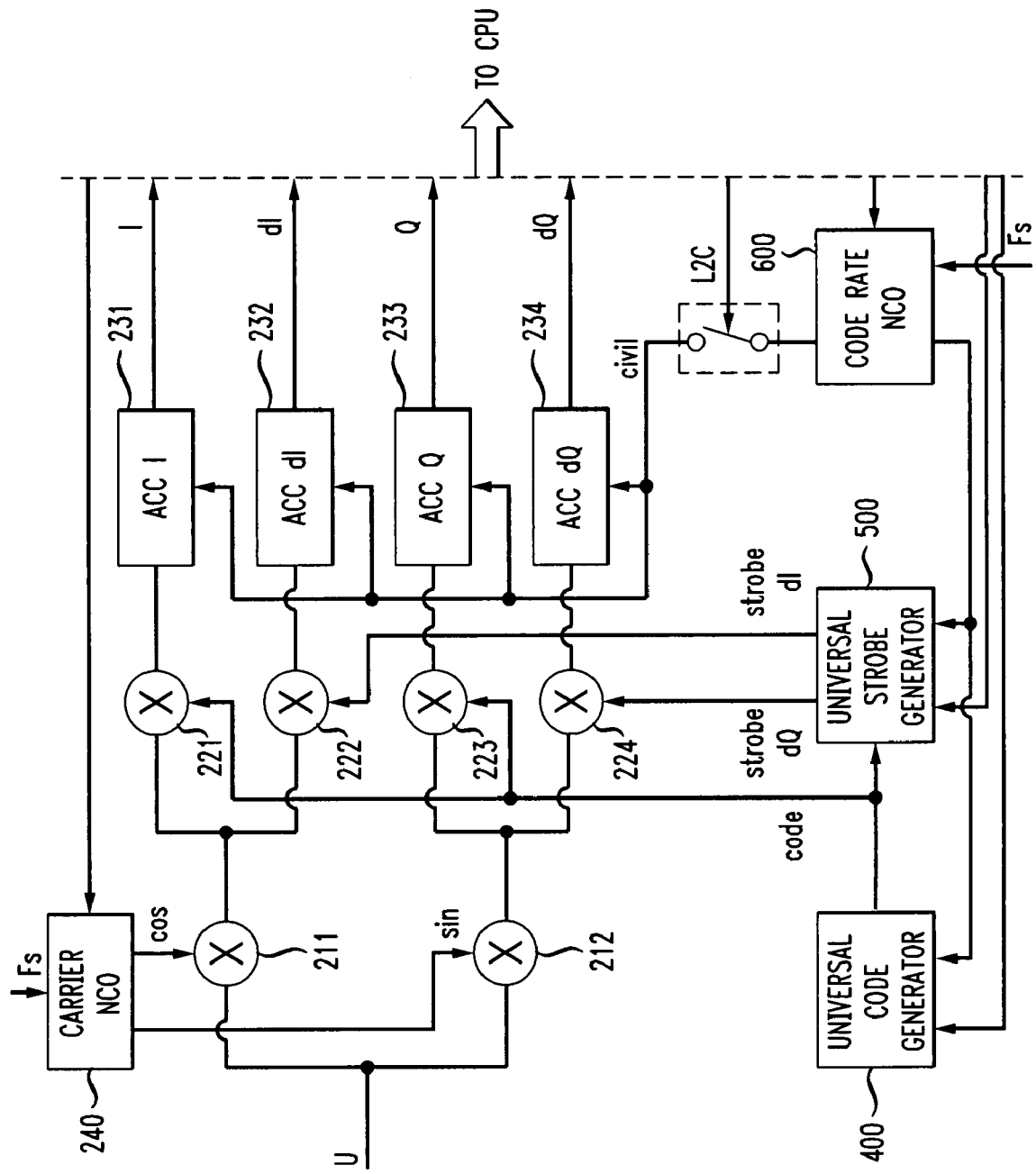
FIG. 2 shows a universal digital channel of the GNSS receiver to process signals on an intermediate frequency for an analog RF-part with I-output in accordance with an embodiment of the present invention.

FIG. 1 is a block diagram illustrating the basic principles of an embodiment of the present invention. Signals from the satellites in view are received by an antenna 100, amplified by a low noise amplifier (LNA) 110, and then, via an RF-cable 120, transmitted to a receiver RF-part 130. The RF-part 130 amplifies the signal and transfers it onto an intermediate frequency. For multi-system (for example, GPS+GLO-NASS+GALILEO) and multi-band (for instance, L1+L2+L5) receivers, this operation is carried out in an individual RF-part for each system for each frequency range. The signal is further subject to digitizing, i.e., discretization and quantization by an analog-digital converter (ADC) 140. Discretization frequency Fs is generated by a reference oscillator 145. An analog-digital converter may convert signals with two-level or three-level quantization. After conversion, each digital signal for each satellite and for each signal type is processed in an individual universal digital channel 200. In one embodiment, each universal digital channel includes three or four correllators (to generate I, Q, dI and dQ correlation signals) which are designed to correlate input samples with the samples of the reference signal (as shown in FIG. 2). Correlation signals from the m channels are delivered to a microcomputer 190 which includes a microprocessor, memory, and interfaces.

A set of numbers from the output of each digital universal processing channel is provided to the corresponding tracking channel in the receiver microprocessor. Here, there is a phase lock loop (PLL) to track the carrier phase based on these numbers, and a delay lock loop (DLL) to track delay of PRN code. Carrier phase and pseudo-range are generated by integrating control signals from the PLL and DLL filter outputs. In addition, in the process of demodulating binary symbols, ephemeris data is generated to compute satellite coordinates.

The channel settings determine signal types, satellite numbers, and navigation systems. PRN code of the reference signal (GPS and GALILEO) or carrier numbers (GLONASS) are selected depending on the satellite number. A number of universal digital channels with correllators are usually produced as a chip (i.e., an application-specific integrated circuit (ASIC)).

The RF-part of the navigation receiver can be built according to two principles. In the first case, a signal is transferred onto an intermediate frequency and the ADC 140 outputs digital code U (as shown in FIG. 2). In the second case, the signal is transferred onto the frequency close to zero (baseband signal) and the ADC 140 outputs two digital codes $U_I$ and $U_Q$ (as shown in FIG. 3).

FIG. 2 is a block diagram of the universal channel in accordance with an embodiment of the invention. Digital samples of the reference carrier are generated by a carrier numerical controlled oscillator (NCO) 240. Code rate NCO (i.e., code rate generator) 600 takes clock rate Fs from the reference oscillator 145 (FIG. 1) and generates code rate (i.e., frequency) for a code generator 400, strobe generator 500. Through receiver's processor information the civil signal can be transferred from code rate NCO 600 to accumulators 231-234 to receive L2C signal. The signals from tracking systems PLL and DLL are provided through the receiver processor to Carrier NCO 240, code rate NCO 600, Universal code generator 400. A vector of the strobe shape is loaded to a universal strobe generator 500.

To generate the I signal, signal U is multiplied (as shown with multiplication block 211) by a cosine reference carrier from the Carrier NCO 240. The signal is then multiplied (shown with multiplication block 221) by PRN code from the universal code generator 400 and is integrated in accumulator 231. To generate the Q signal, the signal U is multiplied (shown with multiplication block 212) by sine reference carrier from the Carrier NCO 240, and after that the obtained signal is multiplied (via multiplication block 223) by PRN code from the universal code generator 400 and integrated in accumulator 233. To form the dI signal, the signal U is multiplied (shown with multiplication block 211) by a cosine reference carrier from the Carrier NCO 240. The obtained signal is then multiplied (shown with multiplication block 222) by strobe sequence dI from a universal strobe generator 500 and is further integrated in accumulator 232. To generate a dQ signal, the signal U is multiplied (via multiplication block 212) by the sine reference carrier from the Carrier NCO 240, and then the obtained product is multiplied (via multiplication block 224) by the strobe sequence dQ from the universal strobe generator 500 and is integrated in the accumulator 234. A receiver processor (CPU) reads information from the accumulators 231, 232, 233 and 234 at determined time moments and then the accumulators are reset. After the resetting, the process of integrating repeats.

Figure 3:
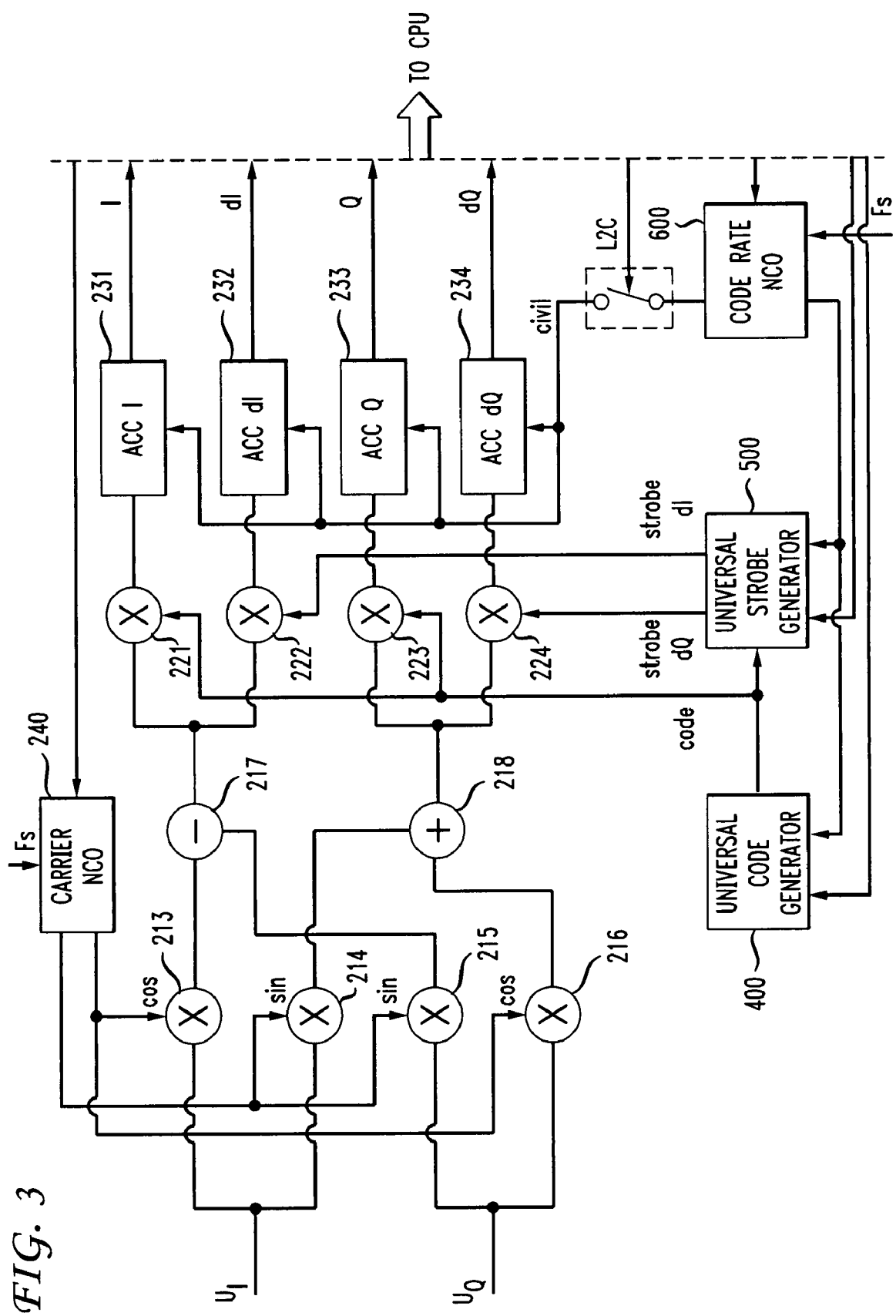
FIG. 3 shows a universal digital channel of the GNSS receiver to process baseband signals for analog RF-part with I-Q output in accordance with an embodiment of the present invention.

FIG. 3 shows a diagram of correlators which process the baseband signal. To generate the I signal, the signal $U_I$ is multiplied (via multiplication block 213) by the cosine reference carrier from the Carrier NCO 240, while the signal $U_Q$ is multiplied (via multiplication block 215) by the sine reference carrier from the Carrier NCO 240 and the product 215 is subtracted (via subtraction block 217) from the product 213:

$$U_I \times \cos(\omega t) - U_Q \times \sin(\omega t) \qquad (1)$$

The obtained difference is multiplied (via multiplication block 221) by the PRN code from universal code generator 400 and the product is integrated in accumulator 231.

To generate Q signal, the signal $U_Q$ is multiplied (via multiplication block 216) by the cosine reference carrier from the Carrier NCO 240, while the signal $U_I$ is multiplied (via multiplication block 214) by the sine reference carrier from the Carrier NCO 240 and the product 216 is added (via addition block 218) to the product 214:

$$U_Q \times \cos(\omega t) + U_I \times \sin(\omega t) \qquad (2)$$

The obtained sum 218 is multiplied (via multiplication block 223) by the PRN code from the code generator 400 and the product is integrated in accumulator 233.

To generate the dI signal, equation (1) (described above) is used. The difference 217 is multiplied (via multiplication block 222) by the strobe sequence dI from the universal strobe generator 500 and the product is integrated in accumulator 232. To form the dQ signal, equation (2) (described above) is used. The sum 218 is multiplied (via multiplication block 224) by the strobe sequence dQ from the universal strobe generator 500 and the product is integrated in accumulator 234. The receiver processor (CPU) reads the information of the accumulators 231, 232, 233 and 234. The accumulators are then reset, and the process of integrating repeats.

Figure 4:
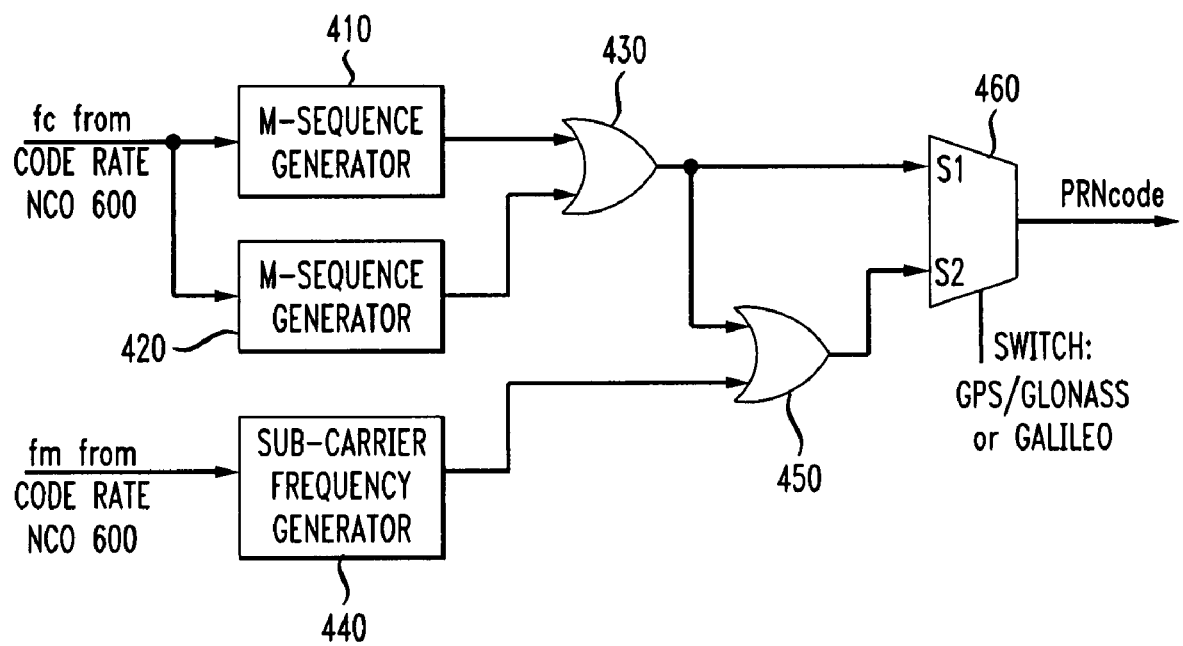
FIG. 4 shows a universal generator of PRN codes in accordance with an embodiment of the present invention.
Figure 5A:
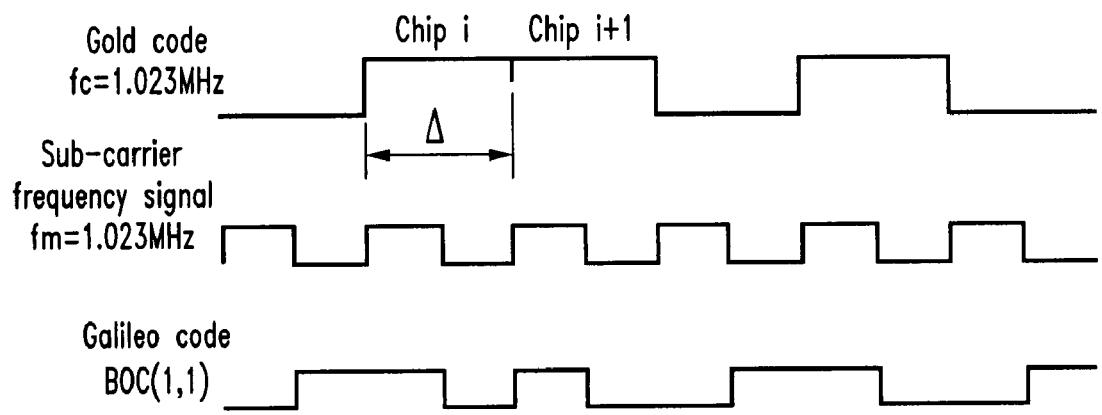
FIG. 5A.
Figure 5B:
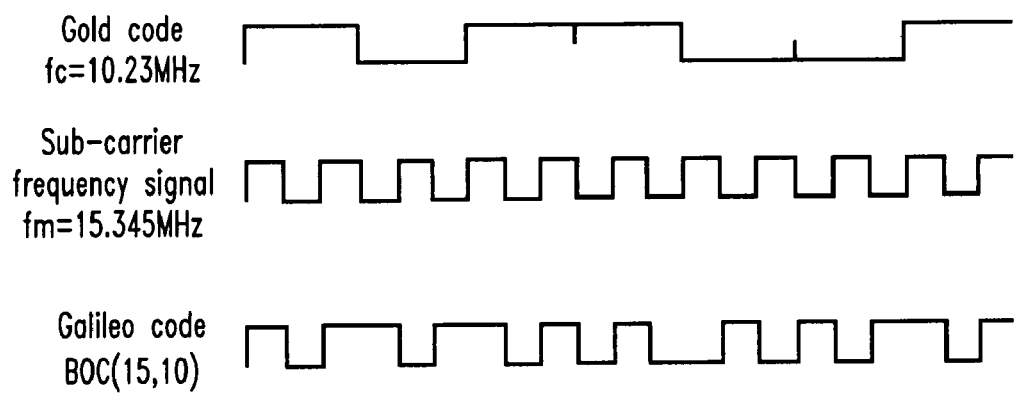
FIG. 5B show examples of binary offset carrier BOC(1,1) and BOC(15,10) signals in accordance with an embodiment of the present invention.

FIG. 4 shows a block diagram of the universal code generator 400 in accordance with an embodiment of the present invention. The code generator 400 consists of two m-sequence generators 410, 420, outputs of which are modulo-2 added in gate 430. The sum of the addition is transmitted to a switch 460. In the mode of generating GPS or GLONASS codes, the switch output is connected to the input S1. In the mode of generating BOC signals (for instance, GALILEO), the switch output is connected to the input S2. For the Galileo system, sub-carrier signal 440 is modulo-2 added to the sum 430 by gate 450. PRN code rate is defined by fc frequency and fm frequency from the Code Rate NCO 600. These rates are transmitted to the Code Rate NCO 600 from processor 190. In the S1 position of the switch 460, the frequency of the PRN code is determined by fc frequency. In the switch position S2, to generate BOC signals, fm frequency must be greater than or equal to fc frequency, where fc frequency is formed in the Code Rate NCO 600 by dividing fm frequency by a factor k. To generate possible BOC signals, fm frequency is divided by the factor k, which may equal 1 . . . 8 with intervals of 0.5. The dividing factor is loaded from the receiver processor and enables generation of signals BOC (m, c) where c=fc/$f_{C/A}$, m=fm/$f_{C/A}$, $f_{C/A}$=1.023 [MHz] and fc=fm/k (for instance BOC(1,1) k=1, BOC(15,10) k=1.5, as shown in FIG. 5A and FIG. 5B, respectively).

In the GLONASS, the transmitted code is an m-sequence. To have such a sequence outputted at the generator 400, it is necessary to fix the S1 position of the switch 460 and to set the same settings for m-sequence generators 410 and 420. Each m-sequence generator has a shift register, an initial register, a polynomial register, and a final register. When the GPS C/A signal is used, the same values can be programmed for the satellites for the initial register and the polynomial register in the generator 410. In generator 420, the value of the initial register may define the satellite number. A civil signal L2C may be multiplexed. Each of CM and CL codes is a part of m-sequence. In one embodiment, the satellites have the same polynomial value but differ from each other by the registers of initial and final states. When the value of the shift register becomes equal to that of the final register, the number from the initial register is loaded into the shift register. Each universal digital channel 200 can accept only one of the codes CM or CL. In one embodiment, the chip rate of each code of the transmitted signal is 511.5 kHz while the frequency of sum signal is 1.023 MHz. This means that chips of each code are transmitted for ~977.5 ps. To receive one of the codes, the fs frequency is output at 511.5 kHz from the Code Rate NCO 600. Code Rate NCO 600 generates the civil signal which, according to a command from the processor, is transmitted to accumulators 231 . . . 234. This signal civil allows values to be stored in accumulators 231 . . . 234 for the first half of each code sequence chip duration. This signal has a frequency of 511.5 kHz and the prohibitive duration of integrating accumulator inputs is $1/1023000$ s. It allows signal values to be integrated in the accumulator during transmission of CM or CL chips in the given channel. In L2C, the polynomial degree is 27, hence, the capacity (width) of registers (shift, initial, polynomial and final registers) is at least 27. As the capacity of the processor and data buses are normally proportional to $2^x$, the register capacity can be equal to 32. It will also allow Gold codes to be formed in the Galileo. In one embodiment, the maximal polynomial degree is 25.

The universal strobe generator 500 (shown in FIG. 3) generates strobe dI and strobe dQ sequences to form dI and dQ signals, respectively. These strobe sequences are influenced by the PRN code sequence which is outputted by the code generator 400. The shape of strobes is defined by a vector of L elements. Each element can be positive, negative or zero. In the case of a three-level amplitude strobe, the vector element can be equal to +1, −1 and 0.

Figure 6:
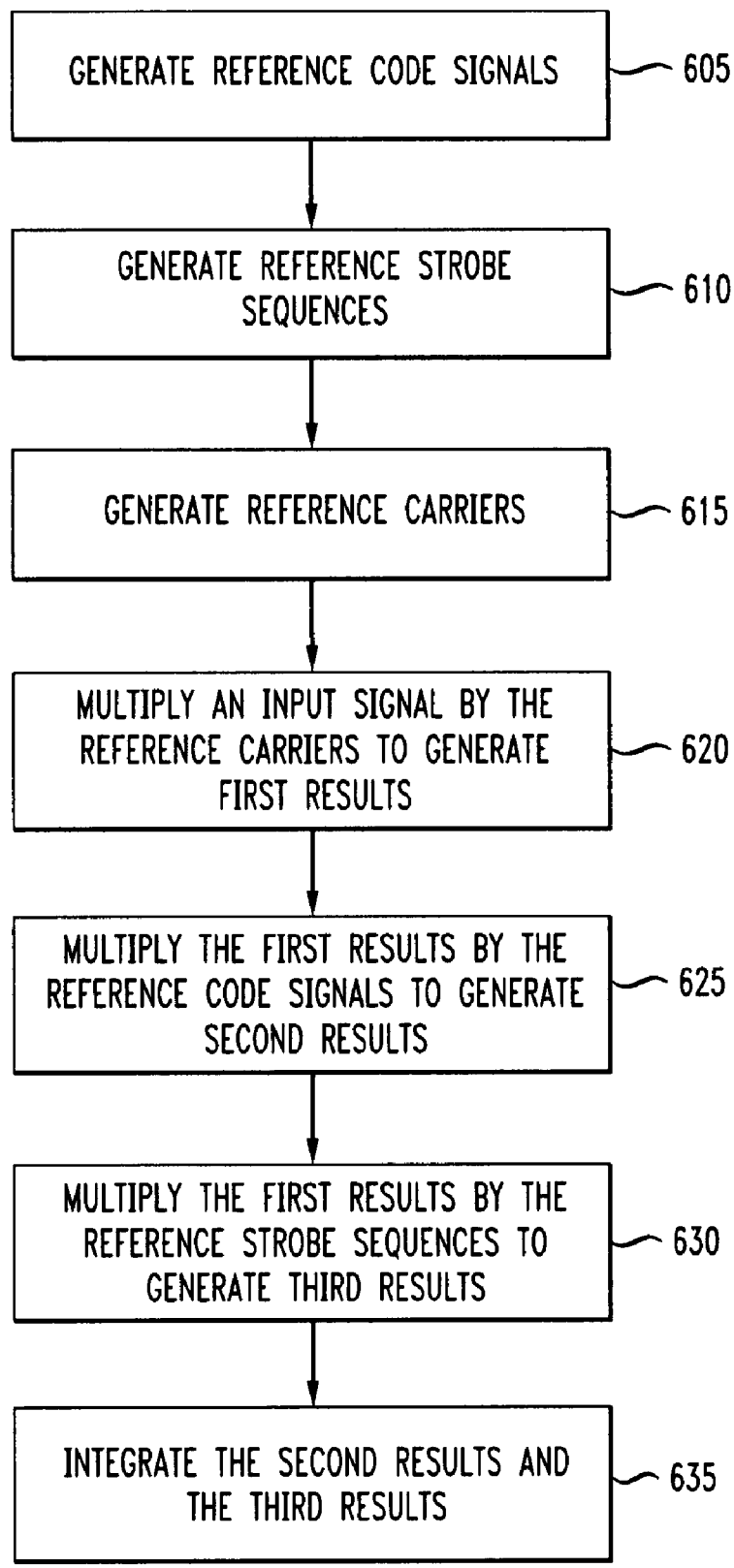
FIG. 6 shows a flowchart illustrating the steps performed in accordance with an embodiment of the present invention.

FIG. 6 shows an algorithm in a generalized form illustrating the steps performed by the receiver in accordance with an embodiment of the present invention. Reference code sequences are generated by the universal code generators in step 605. Reference strobe sequences are generated by the universal strobe generator in step 610. Reference carriers are then generated in step 615. An input signal, obtained at the RF-path output and digitized, is multiplied by the reference carriers to generate a first result in step 620. The first results are then multiplied by the reference code signals to generate second results in step 625. The first results are additionally multiplied by the reference strobe sequences to generate third results in step 630. The second results and the third results are integrated in step 635 to obtain correlation signals I, Q, dI, dQ and the result(s) of these integrations are transmitted to the processor. The integrators are then reset and the integrating begins again.

Figure 7A:
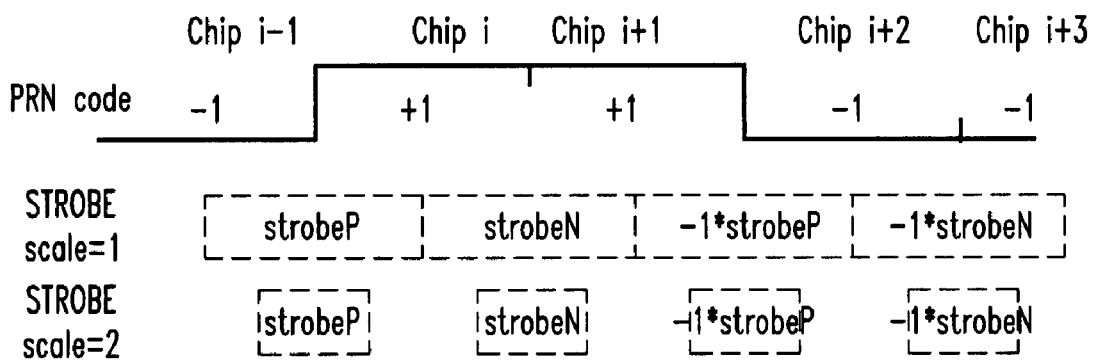
FIG. 7A and FIG. 7B show strobes being formed by the universal strobe generator in accordance with an embodiment of the present invention.

FIG. 7A shows an example diagram of setting the strobe for a certain PRN code. The strobe generator maintains four different vectors: strobe P and strobe N to generate the dI signal, and another two vectors to form the dQ signal. FIG. 7A shows an example of generating the strobe sequence for one of the signals.

The part of the PRN code sequence shown in FIG. 7A consists of the following chips:

−1; 1; 1; −1; −1

In the process of PRN code transition from "−1" into "+1", the universal strobe generator 500 outputs a digital sequence of the values belonging to the strobe P vector. When the PRN code does not change (i.e., a transition from "1" to "1"), the universal strobe generator 500 outputs a digital sequence of the values belonging to the strobe N vector. When the PRN code transitions from "1" to "−1", the universal strobe generator 500 outputs a digital sequence of the strobe P vector multiplied by −1. When the PRN code does not change (i.e., a transition from "−1" to "−1"), the universal strobe generator 500 outputs a digital sequence of strobe N vector multiplied by −1. Thus, in one embodiment there are two different digital sequences generated—strobe dI and strobe dQ—for a PRN code which has been generated by the code generator 400.

A scale factor (SCALE) for the strobe sequence can be selected with the help of the universal code generator 400. At SCALE=1, the duration of strobe dI or strobe dQ is equal to code chip. Thus, the duration of one strobe element (at an L-element vector) is:

$$\delta = \Delta/L \quad (3)$$

where $\Delta$ is the duration of code chip.

When the scale factor changes (e.g., a compression in time), strobe sequence (e.g., shown in FIG. 7A) is generated from the following: the values of the strobe P vector, then zeros, the values of the strobe N, then zeros, etc.

In this case, the duration of one strobe element is:

$$\delta = \Delta/(SCALE*L) \quad (4)$$

where $\Delta$ is the duration of code chip and SCALE is the scale factor.

Figure 7B:
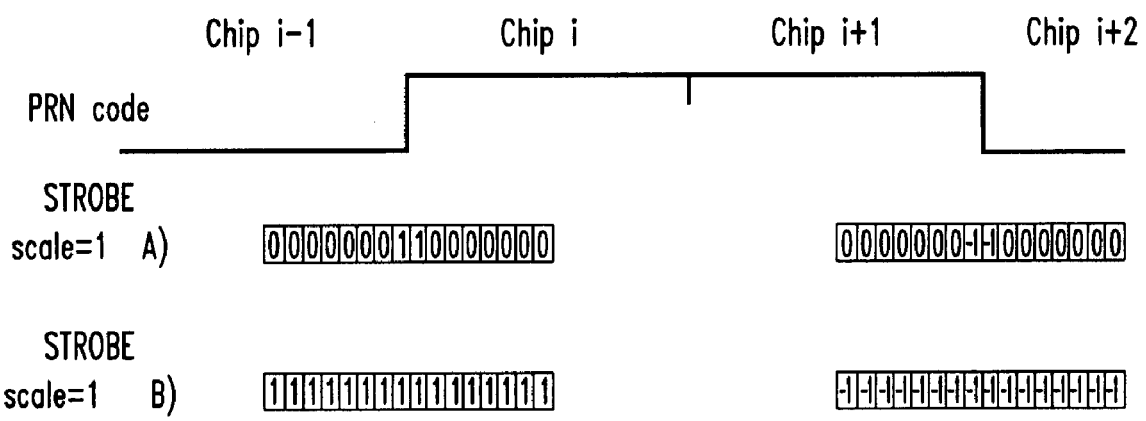

FIG. 7B shows a diagram of the strobe P elements for a few strobe variants. The vector has an even number of elements, its middle point is tied to the code chip boundary, and the number of elements L=16.

Figure 8:
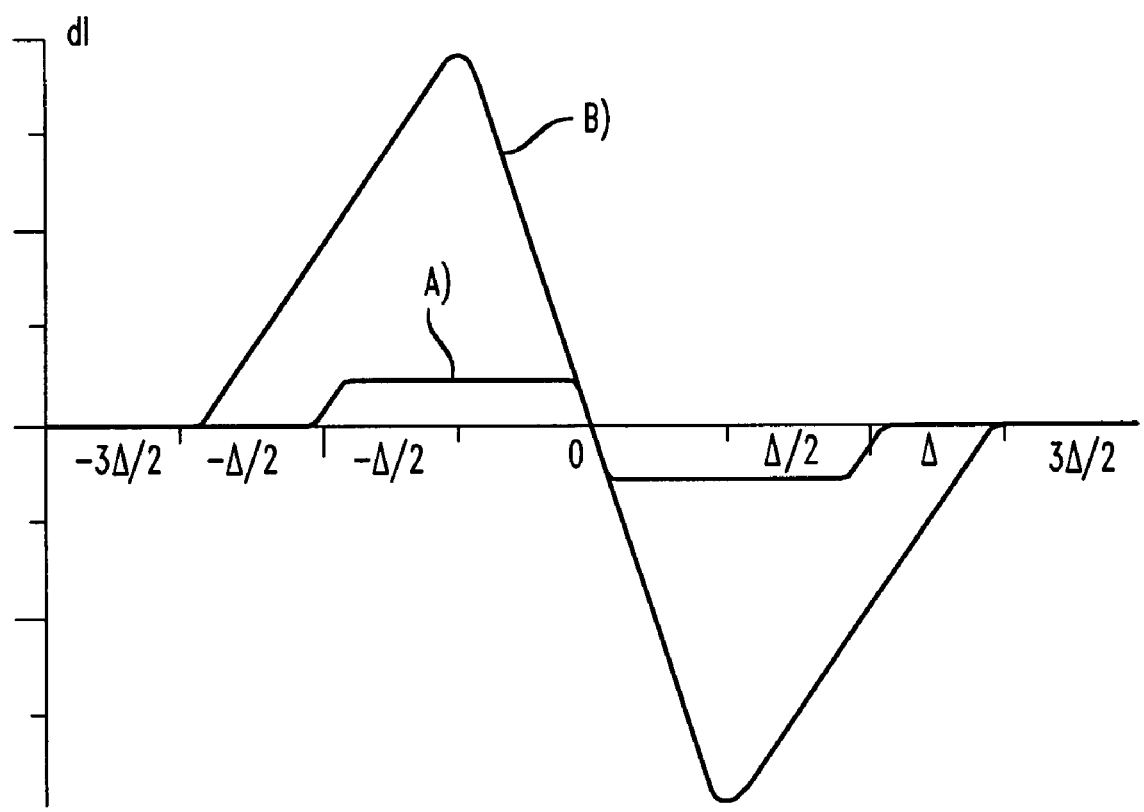
FIG. 8 shows discriminator characteristics in accordance with an embodiment of the present invention.

FIG. 8 is a graphical representation of dI correlator output between the PRN code sequence and strobe sequences that match the variants of FIG. 7B.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An apparatus for processing a plurality of satellite signals received from any one of a plurality of different global navigation satellite systems, the apparatus comprising:

a receiver processor configured to determine for each specific received signal:

the specific global navigation satellite system from which the specific received signal was received;

the specific satellite signal code of the specific received signal; and the specific satellite signal carrier of the specific received signal; and a plurality of universal digital channels, each universal digital channel configured to process any received signal in response to information from the receiver processor, wherein each universal digital channel comprises:

a universal code generator configured to generate a specific reference code based on the specific global navigation satellite system determined by the receiver processor and the specific satellite signal code determined by the receiver processor;

a universal strobe generator configured to generate a specific complex strobe sequence based on the specific global navigation satellite system determined by the receiver processor and the specific reference code generated by the universal code generator;

a carrier generator configured to generate a specific reference carrier corresponding to a the specific satellite signal carrier determined by the receiver processor;

a code rate generator configured to generate a specific reference frequency for the universal code generator, wherein the specific reference frequency is based on the specific satellite signal code determined by the receiver processor; and a plurality of correlators comprising:

a first correlator configured to compute a specific in-phase correlation signal I from the specific reference carrier generated by the carrier generator and the specific reference code generated by the universal code generator;

a second correlator configured to compute a specific quadrature correlation signal Q from the specific reference carrier generated by the carrier generator and the specific reference code generated by the universal code generator; and a third correlator configured to compute a specific correlation signal dI from the specific reference carrier generated by the carrier generator and the specific complex strobe sequence generated by the universal strobe generator.

2. The apparatus of claim 1 wherein said plurality of different global navigation satellite systems comprises GPS, GLONASS, and GALILEO.

3. The apparatus of claim 1 wherein:

the first correlator comprises:

a first multiplier configured to multiply an input signal by the specific reference carrier and by the specific reference code to generate a first product; and a first accumulator configured to integrate the first product;

the second correlator comprises:

a second multiplier configured to multiply the input signal by the specific reference carrier phase-shifted by ninety degrees and by the specific reference code to generate a second product; and a second accumulator configured to integrate the second product; and the third correlator comprises:
  a third multiplier configured to multiply the input signal by the specific reference carrier and by the specific complex strobe sequence to generate a third product; and
  a third accumulator configured to integrate the third product.

4. The apparatus of claim 1, wherein the plurality of correlators further comprise a fourth correlator configured to compute a specific correlation signal dQ from the specific reference carrier and the specific complex strobe sequence.

5. The apparatus of claim 4 wherein:
the first correlator comprises:
  a first multiplier configured to multiply an input signal by the specific reference carrier and by the specific reference code to generate a first product; and
  a first accumulator configured to integrate the first product;
the second correlator comprises:
  a second multiplier configured to multiply the input signal by the specific reference carrier phase-shifted by ninety degrees and by the specific reference code to generate a second product; and
  a second accumulator configured to integrate the second product;
the third correlator comprises:
  a third multiplier configured to multiply the input signal by the specific reference carrier and by the specific complex strobe sequence to generate a third product; and
  a third accumulator configured to integrate the third product; and
the fourth correlator comprises:
  a fourth multiplier configured to multiply the input signal by the specific reference carrier phase-shifted by ninety degrees and by the specific complex strobe sequence to generate a fourth product; and
  a fourth accumulator configured to integrate the fourth product.

6. The apparatus of claim 1 wherein said specific reference code comprises a specific m-sequence code or a specific Gold code.

7. The apparatus of claim 1 wherein said universal code generator is further configured to multiply said specific reference code by a sub-carrier signal to generate a specific binary offset carrier (BOC) signal.

8. The apparatus of claim 1 wherein said universal code generator comprises a plurality of m-sequence generators, a sub-carrier generator, and a switch to redirect Gold codes or binary offset carrier signals.

9. The apparatus of claim 8 wherein each of said plurality of m-sequence generators comprises a shift register, an initial state register, and polynomial register values, said polynomial register values being logically added to the values of the shift register and the sum being transmitted to the input of said shift register.

10. The apparatus of claim 9 wherein said shift register and said initial state register are at least twenty-seven bits.

11. The apparatus of claim 8 wherein a frequency of a sub-carrier signal generated by said sub-carrier generator is coherent with a frequency of a code sequence generated by an m-sequence generator in said plurality of m-sequence generators and is greater than or equal to said frequency of said code sequence.

12. The apparatus of claim 11 wherein said frequency of a code sequence is generated by dividing said sub-carrier signal frequency by a dividing factor, said dividing factor equal to 1 . . . 8 with an interval of 0.5, thereby allowing different binary offset carrier signals to be generated.

13. The apparatus of claim 1 wherein each strobe in said specific complex strobe sequence is defined by a vector of numbers.

14. The apparatus of claim 13 wherein said each strobe in said specific complex strobe sequence is further defined by a compression factor which enables strobe duration to be less than or equal to chip duration.

15. The apparatus of claim 1 wherein the shape of said specific complex strobe sequence comprises a first vector for a case of transition between neighboring code chips and a second vector for a non-transition case.

16. The apparatus of claim 15 wherein said first vector and said second vector each have a dimension corresponding to a number of elements and each element has values +1, −1, and 0.

17. The apparatus of claim 5 wherein each accumulator in said plurality of correlators performs integration during a first half of each chip of a code sequence.

18. An apparatus for processing a plurality of satellite signals received from any one of a plurality of different global navigation satellite systems, the apparatus comprising:
  for each specific received signal, means for determining the specific global navigation system from which the specific received signal was received;
  for each specific received signal, means for determining the specific satellite signal code of the specific received signal;
  for each specific received signal, means for determining the specific satellite signal carrier of the specific received signal;
  means for generating a specific reference code based on the determined specific global navigation satellite system and the determined specific satellite signal code;
  means for generating a specific complex strobe sequence based on the determined specific global navigation satellite system and the generated specific reference code;
  means for generating a specific reference carrier corresponding to the determined specific satellite signal carrier;
  means for generating a specific reference frequency for the means for generating a specific reference code;
  means for computing a specific in-phase correlation signal I from the generated specific reference carrier and the generated specific reference code;
  means for computing a specific quadrature correlation signal Q from the generated specific reference carrier and the generated specific reference code; and
  means for computing a specific correlation signal dI from the generated specific reference carrier and the generated specific complex strobe sequence.

19. The apparatus of claim 18 wherein:
the means for computing a specific in-phase correlation signal I comprise:
  means for multiplying an input signal by the generated specific reference carrier and by the generated specific reference code to generate a first product; and
  means for integrating the first product;
the means for computing a specific quadrature correlation signal Q comprises:
  means for multiplying the input signal by the generated specific reference carrier phase-shifted by ninety degrees and by the generated specific reference code to generate a second product; and
  means for integrating the second product; and the means for computing a specific correlation signal dI comprises:
  means for multiplying the input signal by the generated specific reference carrier and by the generated specific complex strobe sequence to generate a third product; and
  means for integrating the third product.

20. The apparatus of claim 18, further comprising means for computing a specific correlation signal dQ from the generated specific reference carrier and the generated specific complex strobe sequence.

21. The apparatus of claim 20, wherein:
the means for computing a specific in-phase correlation signal I comprise:
  means for multiplying an input signal by the generated specific reference carrier and by the generated specific reference code to generate a first product; and
  means for integrating the first product;
the means for computing a specific quadrature correlation signal Q comprises:
  means for multiplying the input signal by the generated specific reference carrier phase-shifted by ninety degrees and by the generated specific reference code to generate a second product; and
  means for integrating the second product; and
the means for computing a specific correlation signal dI comprises:
  means for multiplying the input signal by the generated specific reference carrier and by the generated specific complex strobe sequence to generate a third product; and
  means for integrating the third product; and
the means for computing a specific correlation signal dQ comprises:
  means for multiplying the input signal by the generated specific reference carrier phase-shifted by ninety degrees and by the generated specific complex strobe sequence to generate a fourth product; and
  means for integrating the fourth product.

22. The apparatus of claim 18 further comprising means for multiplying the generated specific reference code by a sub-carrier signal to generate a specific binary offset carrier (BOC) signal.

23. A method for processing a plurality of satellite signals received from any one of a plurality of different global navigation satellite systems, the method comprising the steps of:
  for each specific received signal, determining with a receiver processor the specific global navigation system from which the specific received signal was received;
  for each specific received signal, determining with the receiver processor the specific satellite signal code of the specific received signal;
  for each specific received signal, determining with the receiver processor the specific satellite signal carrier of the specific received signal;
  generating a specific reference code based on the determined specific global navigation satellite system and the determined specific satellite signal code;
  generating a specific complex strobe sequence based on the determined specific global navigation satellite system and the generated specific reference code;
  generating a specific reference carrier corresponding to the determined specific satellite signal carrier;
  generating a specific reference frequency for generating the specific reference code;
  computing a specific in-phase correlation signal I from the generated specific reference carrier and the generated specific reference code;
  computing a specific quadrature correlation signal Q from the generated specific reference carrier and the generated specific reference code; and
  computing a specific correlation signal dI from the generated specific reference carrier and the generated specific complex strobe sequence.

24. The method of claim 23 wherein:
the step of computing a specific in-phase correlation signal I comprises the steps of:
  multiplying an input signal by the generated specific reference carrier and by the generated specific reference code to generate a first product; and
  integrating the first product;
the step of computing a specific quadrature correlation signal Q comprises the steps of:
  multiplying the input signal by the generated specific reference carrier phase-shifted by ninety degrees and by the generated specific reference code to generate a second product; and
  integrating the second product; and
the step of computing a specific correlation signal dI comprises the steps of:
  multiplying the input signal by the generated specific reference carrier and by the generated specific complex strobe sequence to generate a third product; and
  integrating the third product.

25. The method of claim 24, further comprising the step of:
computing a specific correlation signal dQ from the generated specific reference carrier and the generated specific complex strobe sequence.

26. The method of claim 25, wherein:
the step of computing a specific in-phase correlation signal I comprises the steps of:
  multiplying an input signal by the generated specific reference carrier and by the generated specific reference code to generate a first product; and
  integrating the first product;
the step of computing a specific quadrature correlation signal Q comprises the steps of:
  multiplying the input signal by the generated specific reference carrier phase-shifted by ninety degrees and by the generated specific reference code to generate a second product; and
  integrating the second product;
the step of computing a specific correlation signal dI comprises the steps of:
  multiplying the input signal by the generated specific reference carrier and by the generated specific complex strobe sequence to generate a third product; and
  integrating the third product; and
the step of computing a specific correlation signal dQ comprises the steps of:
  multiplying the input signal by the generated specific reference carrier phase-shifted by ninety degrees and by the generated specific complex strobe sequence to generate a fourth product; and
  integrating the fourth product.

27. The method of claim 24 further comprising the step of multiplying said specific reference code by a sub-carrier signal to generate a specific binary offset carrier (BOC) signal.

28. The apparatus of claim 1, wherein said apparatus is part of a receiver configured to determine from said received plurality of satellite signals at least one of:

frequency bands of said received plurality of satellite signals;
PRN codes of said received plurality of satellite signals;
phases of said PRN codes;
code rates of said PRN codes; and
chip durations of said PRN codes.

29. The apparatus of claim 18, further comprising:
means for determining frequency bands of said received plurality of satellite signals;
means for determining PRN codes of said received plurality of satellite signals;
means for determining phases of said PRN codes;
means for determining code rates of said PRN codes; and
means for determining chip durations of said PRN codes.

30. The apparatus of claim 1, wherein said universal strobe generator is further configured to:
generate during a first stage a specific first strobe sequence comprising specific single rectangular strobes; and
generate during a second stage a specific second strobe sequence comprising specific complex strobes.

31. The apparatus of claim 18, further comprising:
means for generating during a first stage a specific first strobe sequence comprising specific single rectangular strobes; and
means for generating during a second stage a specific second strobe sequence comprising specific complex strobes.

32. The method of claim 23, further comprising the steps of:
generating during a first stage a specific first strobe sequence comprising specific single rectangular strobes; and
generating during a second stage a specific second strobe sequence comprising specific complex strobes.

* * * * *

UNITED STATES PATENT AND TRADEMARK OFFICE
CERTIFICATE OF CORRECTION

PATENT NO. : 7,764,226 B1
APPLICATION NO. : 11/732281
DATED : July 27, 2010
INVENTOR(S) : Andrey Veitsel et al.

It is certified that error appears in the above-identified patent and that said Letters Patent is hereby corrected as shown below:

Column 10, line 29 "~977.5 ps" should read --~977.5 µs--

Column 12, line 26 "to a the" should read --to the--

Signed and Sealed this
Twenty-fourth Day of May, 2011

David J. Kappos
*Director of the United States Patent and Trademark Office*